United States Patent
Valiquette, Jr.

(10) Patent No.: US 10,624,491 B1
(45) Date of Patent: Apr. 21, 2020

(54) VACUUM BREWED BEVERAGE APPARATUS

(71) Applicant: Michael Anthony Valiquette, Jr., Elk River, MN (US)

(72) Inventor: Michael Anthony Valiquette, Jr., Elk River, MN (US)

(*) Notice: Subject to any disclaimer, the term of this patent is extended or adjusted under 35 U.S.C. 154(b) by 408 days.

(21) Appl. No.: 15/478,989

(22) Filed: Apr. 4, 2017

(51) Int. Cl.
*A47J 31/44* (2006.01)
*A47J 31/46* (2006.01)

(52) U.S. Cl.
CPC ......... *A47J 31/4403* (2013.01); *A47J 31/446* (2013.01); *A47J 31/46* (2013.01)

(58) Field of Classification Search
CPC .................................................. A47J 31/043
USPC .......................................................... 99/292
See application file for complete search history.

(56) References Cited

U.S. PATENT DOCUMENTS

| | | | | |
|---|---|---|---|---|
| 449,603 A * | 3/1891 | Thrall | ........... | A47J 31/043 99/292 |
| 2,097,681 A * | 11/1937 | Wolcott | ........... | A47J 31/047 99/281 |
| 2,550,513 A * | 4/1951 | Young | ........... | A47J 31/043 99/292 |
| 2,553,344 A * | 5/1951 | Weeks | ........... | A47J 31/0576 99/292 |
| 2,566,916 A * | 9/1951 | Young | ........... | A47J 31/44 99/292 |
| 3,570,390 A * | 3/1971 | Jordan | ........... | A47J 31/0573 99/282 |
| 4,484,514 A * | 11/1984 | Chen | ........... | A47J 31/053 99/282 |
| 6,817,280 B2 * | 11/2004 | Hall | ........... | A47J 31/047 99/292 |
| 2006/0174773 A1 * | 8/2006 | Taylor | ........... | A47J 31/46 99/280 |
| 2007/0056994 A1 * | 3/2007 | Woodnorth | ........... | A47J 31/46 222/221 |
| 2010/0203209 A1 * | 8/2010 | Fishbein | ........... | A47J 31/18 426/433 |
| 2013/0344205 A1 * | 12/2013 | Oh | ........... | B65D 85/8043 426/232 |
| 2014/0227413 A1 * | 8/2014 | Bombeck | ........... | A47J 31/043 426/431 |
| 2015/0017297 A1 * | 1/2015 | Vastardis | ........... | A47J 31/002 426/429 |
| 2016/0368752 A1 * | 12/2016 | Bethuy | ........... | A47J 31/4403 |
| 2017/0295992 A1 * | 10/2017 | Mangold | ........... | A47J 31/002 |
| 2017/0367526 A1 * | 12/2017 | Avins | ........... | A47J 31/10 |
| 2018/0192814 A1 * | 7/2018 | Gormley | ........... | A47J 31/4403 |

* cited by examiner

*Primary Examiner* — Ibrahime A Abraham
*Assistant Examiner* — John J Norton

(57) ABSTRACT

A vacuum brewed beverage apparatus for effectively cooling or heating the beverage after it has been vacuumed brewed. The vacuum brewed beverage apparatus includes a control assembly; a container assembly including a container removably supported by the control assembly and capable of holding liquid and a brewed product; and a brew assembly including a brewing chamber removably supported by the control assembly and being in operable communication with the container.

17 Claims, 4 Drawing Sheets

VACUUM BREWED BEVERAGE APPARATUS

BACKGROUND OF THE INVENTION

Field of the Invention

The present invention relates to beverage brewing devices and more particularly pertains to a new vacuum brewed beverage apparatus for effectively cooling or heating the beverage after it has been vacuumed brewed.

Description of the Prior Art

The use of beverage brewing devices is known in the prior art. More specifically, beverage brewing devices heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a receptacle for a liquid that can be connected to a vacuum pump, a heating arrangement for heating the receptacle causing the liquid to evaporate, a condenser for condensing the vapor, and a collecting vessel for the condensate. Another prior art includes a steeping area configured and adapted to receive a filter, particulate steeping material and hot liquid water for steeping the particulate steeping material into an infusion. A vacuum chamber is positioned below the steeping area. The vacuum chamber has a hermetic wall, a closable lower outlet, and an upper opening leading to the steeping, area. An inlet of a vacuum conduit is positioned in the vacuum chamber, above a maximum liquid level of the vacuum chamber and whereas an outlet thereof is connected to a vacuum source. The inlet is spaced from the wall by an inlet spacing distance. The vacuum source is operable to reduce the pressure in the vacuum chamber in a manner to draw the infusion through the filter and upper opening. While these devices fulfill their respective, particular objectives and requirements, the aforementioned patents do not disclose a new vacuum brewed beverage apparatus.

SUMMARY OF THE INVENTION

The general purpose of the present invention, which will be described subsequently in greater detail, is to provide a new vacuum brewed beverage apparatus which has many of the advantages of the beverage brewing devices mentioned heretofore and many novel features that result in a new vacuum brewed beverage apparatus which is not anticipated, rendered obvious, suggested, or even implied by any of the prior art beverage brewing devices, either alone or in any combination thereof. The present invention includes a control assembly; a container assembly including a container removably supported by the control assembly and capable of holding liquid and a brewed product; and a brew assembly including a brewing chamber removably supported by the control assembly and being in operable communication with the container. None of the prior art includes the combination of the elements of the present invention.

There has thus been outlined, rather broadly, the more important features of the vacuum brewed beverage apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new vacuum brewed beverage apparatus which has many of the advantages of the beverage brewing devices mentioned heretofore and many novel features that result in a new vacuum brewed beverage apparatus which is not anticipated, rendered obvious, suggested, or even implied by any of the prior art beverage brewing devices, either alone or in any combination thereof.

Still another object of the present invention is to provide a new vacuum brewed beverage apparatus for effectively cooling or heating the product after it has been vacuumed brewed.

Still yet another object of the present invention is to provide a new vacuum brewed beverage apparatus that efficiently forces the product through a filter to effectively remove non-dissolved media or the like such as particles from the liquid.

Even still another object of the present invention is to provide a new vacuum brewed beverage apparatus that is compactly and economically setup for noncommercial use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
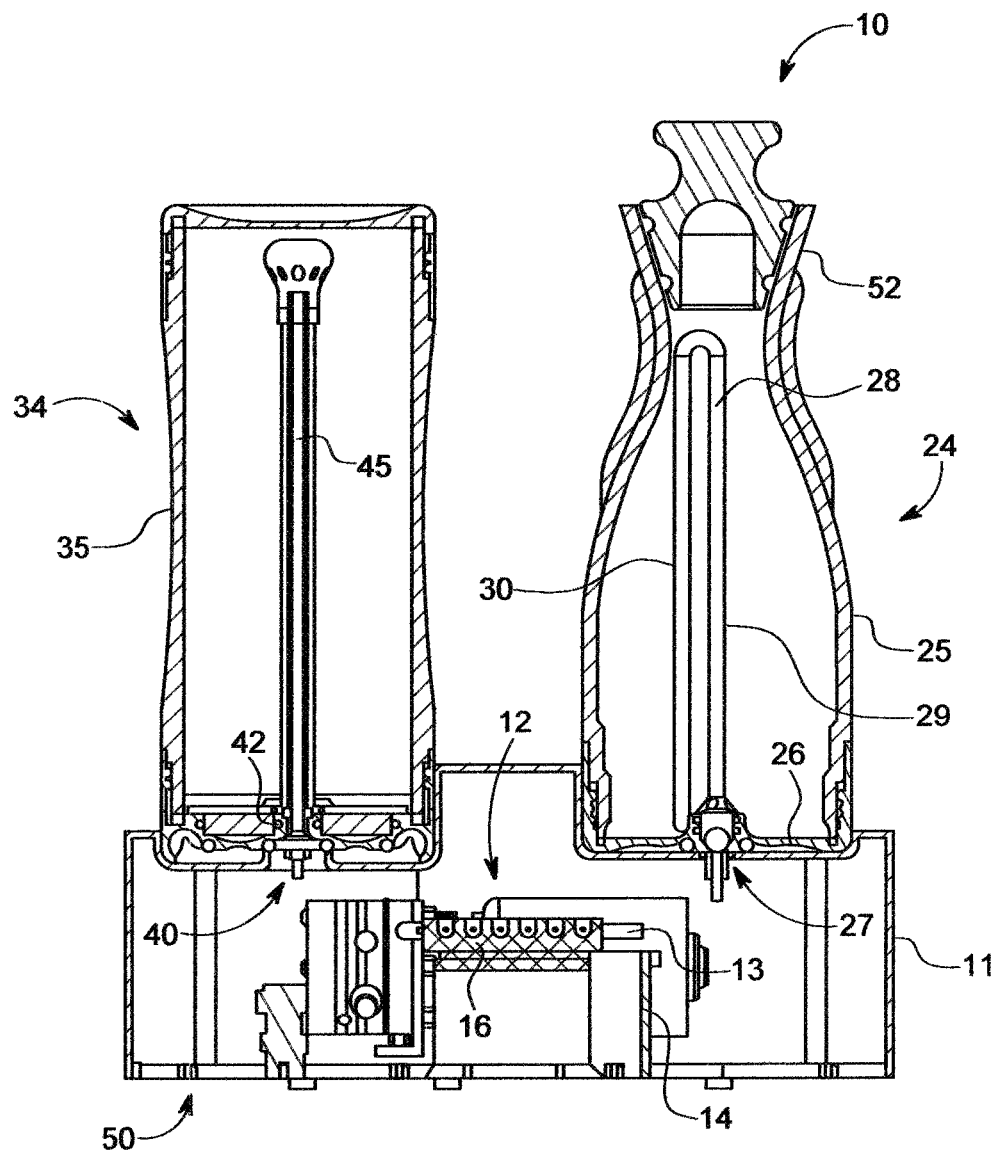
FIG. 1 is a cross-sectional view of a new vacuum brewed beverage apparatus according to the present invention.
Figure 2:
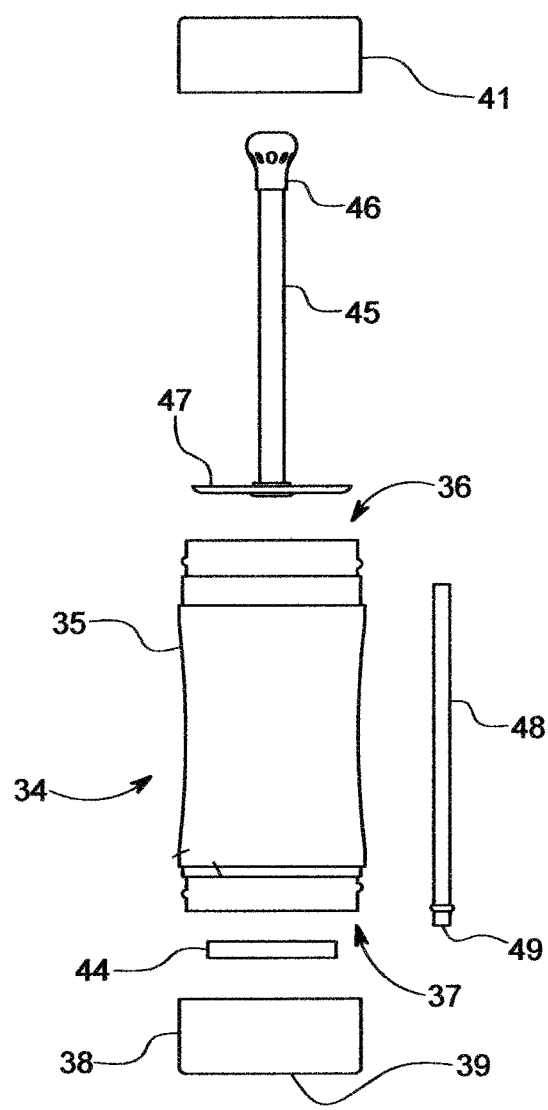
FIG. 2 is an exploded side elevational view of the brew assembly of the present invention.
Figure 3:
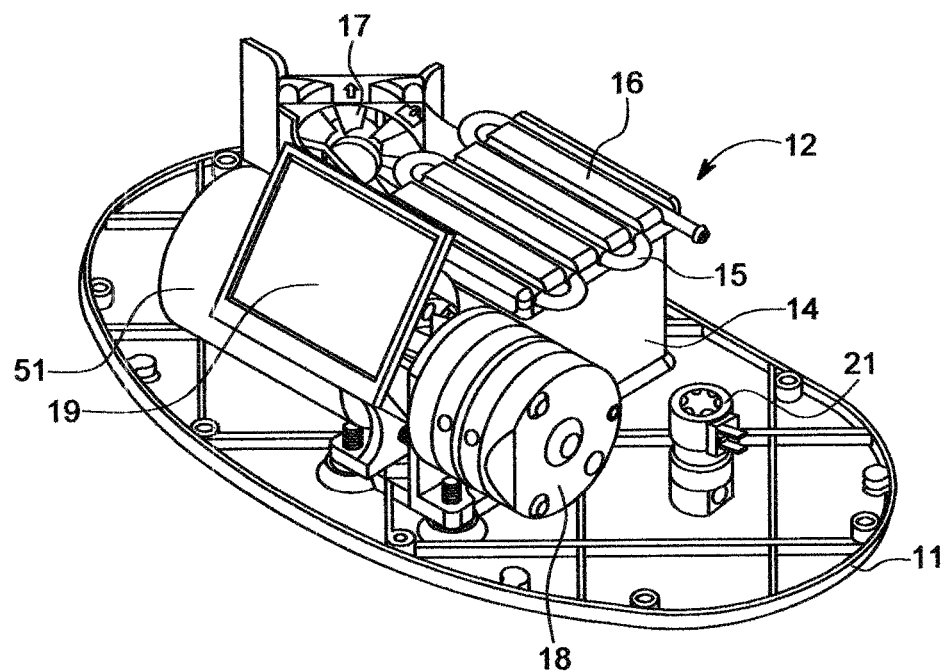
FIG. 3 is a perspective view of the control assembly of the present invention.
Figure 4:
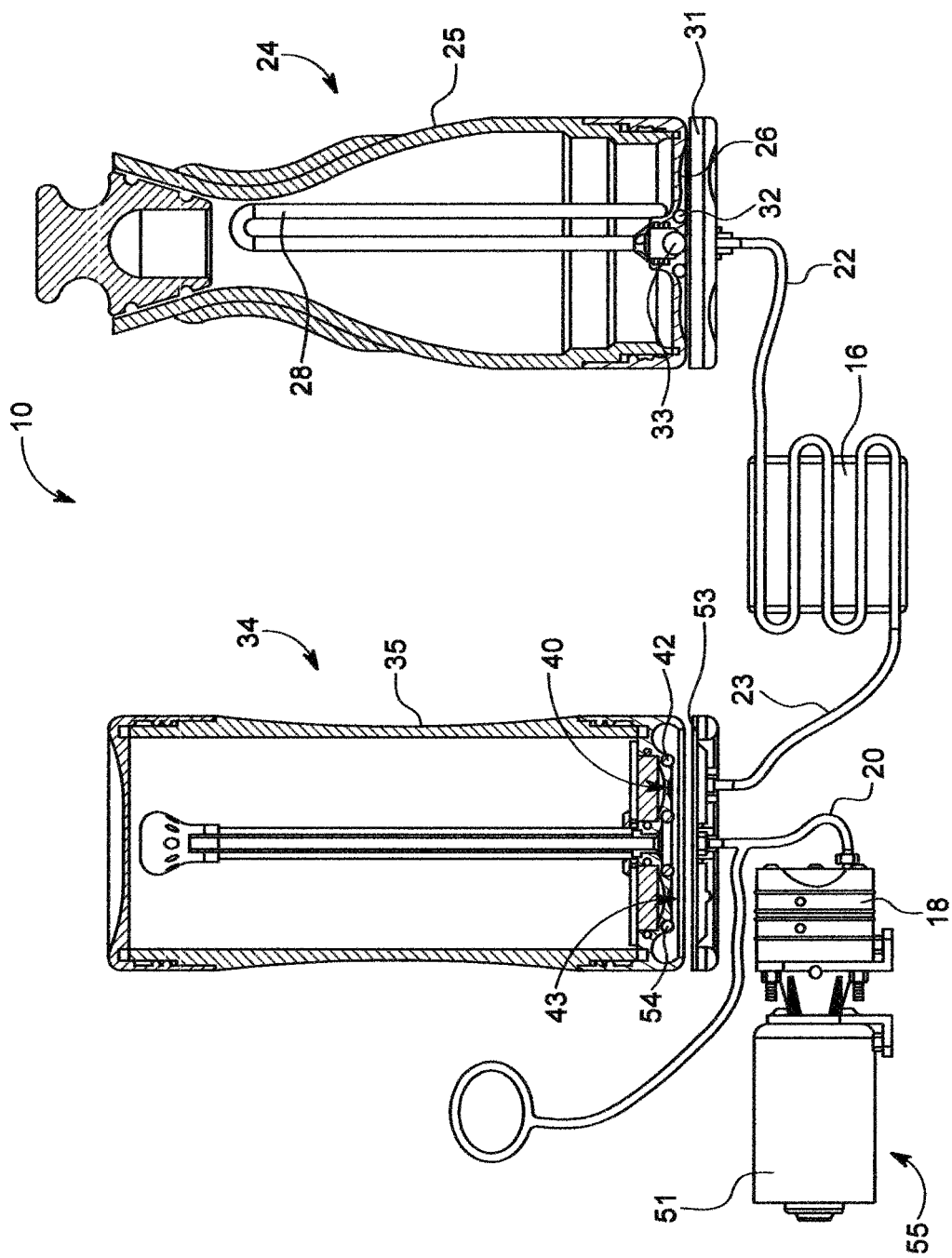
FIG. 4 is an exploded view of the present invention.

With reference now to the drawings, and in particular to FIGS. 1 through 4 thereof, a new vacuum brewed beverage apparatus embodying the principles and concepts of the present invention and generally designated by the reference numeral 10 will be described.

As best illustrated in FIGS. 1 through 4, the vacuum brewed beverage apparatus 10 generally comprises a control assembly 50; a container assembly 24 including a container 25 removably and conventionally supported by the control assembly 50 and capable of holding liquid and a brewed product; and a brew assembly 34 including a brewing chamber 35 removably and conventionally supported by the control assembly 50 and being in operable communication with the container 35.

The control assembly 50 includes a base member 11 and a heating/cooling arrangement 12 and a liquid-transferring conduit 13 in communication with the heating/cooling arrangement 12 and conventionally interconnecting the container 25 with the brewing chamber 35. The heating/cooling arrangement 12 includes a heat sink 14, a heating/cooling element 15, a cold plate 16 all in operable communication with the liquid-transferring conduit 13, and a cooling fan 17 proximate to the cold plate 16 and disposed in the base member 11. The heat sink 14 is conventionally disposed in the base member 11 with the heating element 15, the cold plate 16 and the liquid-transferring conduit 13 conventionally supported upon the heat sink 14. The control assembly 50 also includes a vacuum source 55 such as a vacuum pump 18 with a motor 51 conventionally disposed in the base member 11 and being in operable communication with the brewing, chamber 35. The control assembly 50 further includes a control panel 19 conventionally mounted upon the base member 11 and being in operable communication with the heating/cooling arrangement 12 and the vacuum source 60 to energize and functionally control the brewing process by the vacuum brewed beverage apparatus 10.

The container 25 has a bottom wall 26 with an opening 27 disposed therethrough. The container assembly 24 includes a hollow siphon tube 28 conventionally disposed in the container 25 and conventionally disposed upon the opening 27. The hollow siphon tube 28 has a first elongated portion 29 which extends from the bottom wall 26 to near a top 52 of the container 25 and has a second elongated portion 30 which is curved back upon the elongated first portion 29 and terminates near the bottom wall 26 of the container 25. The container assembly 50 also includes a ball check valve 33 conventionally disposed in the opening 27 of the container 25 to control flow of the liquid out of the container 25 and to also seal the brewed product inside the container 25, and further includes a first seal ring 32 conventionally disposed about the opening 27 of the container 25. The container assembly 24 also includes a hollow siphon tube 28 having a first elongated portion 29 which extends from the bottom wall 26 to near a top of the container 25 and has a second elongated portion 30 which is curved back upon the elongated first portion 29 and terminates near the bottom wall 26 of the container 25.

The brewing chamber 35 has open top and bottom ends 36, 37. The brew assembly 34 further includes an endcap 38 removably and conventionally coupled to the bottom end 37 and also includes a lid 41 removably and conventionally coupled to the top end 36. The endcap 38 has a bottom wall 39 with openings 40, 43 disposed therethrough and second and third seal rings 42, 54 conventionally disposed about the openings 43, 47. The brew assembly 34 also includes a non-dissolved media filter 44 conventionally disposed in the endcap 38 for filtering the leftover non-dissolved media such as particles or the like from the brewed product. The brew assembly 34 further includes a non-dissolved media pre-filtering tool 45 having a screen member 47 for capturing the non-dissolved media or the like not mixed with the liquid, and also having a handle 46 conventionally connected to the screen member 47. The screen member 47 has a circumference generally equivalent to that of the brewing chamber 35 to ensure capturing of the non-dissolved media or the like in the brewing chamber 35. The brew assembly 34 also includes a vacuum tube 48 conventionally disposed in the brewing chamber 35 and having an end 49 disposed at one of the openings 40, 43 of the endcap 38.

In addition, the control assembly 50 has a brew chamber support member 53 with the brew chamber 35 removably interfacing with the brew chamber support member 53, and has a vacuum connecting member 20 conventionally interconnecting the vacuum source 55 to the vacuum tube 48 and also has a vacuum release valve 21 conventionally disposed inline of the vacuum connecting member 20. The control assembly 50 also has a container support member 31 with the container 25 removably interfacing with the container support member 31. The control assembly 50 further includes a first hose 22 conventionally interconnecting the container 25 to the liquid-transferring conduit 13 and further includes a second hose 23 conventionally interconnecting the brewing chamber 35 to the liquid-transferring conduit 13. The first hose 22 is conventionally connected to the container support member 31 and the second hose 23 is conventionally connected to the brew chamber support member 53.

In use, liquid is dispensed in the container 25 and the media or the like to be mixed with the liquid is added to the brewing chamber 35. The user uses the control panel 19 to begin the brewing process by energizing the vacuum pump 18 to create a vacuum in the brewing chamber 35 which draws the liquid from the container 25 into the brewing chamber 35 whereupon, the liquid is brewed with the media or the like to create the brewed product. Any non-dissolved media not fully mixed with the liquid is removed using the non-dissolved media pre-filtering tool 45 and captured with the non-dissolved media filter 44. The vacuum release valve 21 is actuated and the brewing chamber 35 is pressurized and the brewed product is drained from the brewing chamber 35 through the liquid-transferring conduit 13 where the brewed product is either heated or cooled as desired by the user before entering the container 25. The ball check valve 33 seals the brewed product in the container 25 and the user can remove the container 25 and dispense the brewed product as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the vacuum brewed beverage apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vacuum brewed beverage apparatus comprising:
   a control assembly;
   a container assembly including a container removably supported by the control assembly and capable of holding liquid and a brewed product; and
   a brew assembly including a brewing chamber including an open top end and a bottom end removably supported by the control assembly and being in operable communication with the container and a vacuum tube disposed in the brewing chamber;
   wherein the brew assembly further includes an endcap removably coupled to the bottom end and includes a bottom wall with openings disposed therethrough, and also includes a lid removably coupled to the top and, and the vacuum tube includes an end disposed at one of the openings of the endcap.

2. The vacuum brewed beverage apparatus as described in claim 1, wherein the control assembly includes a base member and a vacuum source disposed in the base member and being in communication with the brewing chamber.

3. The vacuum brewed beverage apparatus as described in claim 2, wherein the vacuum source includes a vacuum pump and a motor.

4. The vacuum brewed beverage apparatus as described in claim 2, wherein the control assembly also includes a heating and cooling arrangement and a liquid-transferring conduit in fluid communication with the heating and cooling arrangement and interconnecting the container with the brewing chamber.

5. The vacuum brewed beverage apparatus as described in claim 4, wherein the heating and cooling arrangement includes a heat sink, a heating element, a cooling fan and a cold plate, the heat sink, heating element, cooling fan and cold plate in communication with the liquid-transferring conduit.

6. The vacuum brewed beverage apparatus as described in claim 5, wherein the heat sink is disposed in the base member with the heating and cooling element, the cold plate and the liquid-transferring conduit disposed upon the heat sink.

7. The vacuum brewed beverage apparatus as described in claim 4, wherein the control assembly further includes a control panel mounted upon the base member and being in communication with the heating and cooling arrangement and the vacuum pump to functionally control the brewing process.

8. The vacuum brewed beverage apparatus as described in claim 2, wherein the container has a bottom wall with an opening disposed therethrough.

9. The vacuum brewed beverage apparatus as described in claim 8, wherein the container assembly also includes a hollow siphon tube having a first elongated portion which extends from the bottom wall to near a top of the container and has an second elongated portion which is curved back upon the elongated first portion and terminates near the bottom wall of the container.

10. The vacuum brewed beverage apparatus as described in claim 8, wherein the container assembly also includes a ball check valve disposed in the opening of the container to control flow of the liquid out of the container and to also seal the brewed product inside the container, and further includes a first seal ring disposed about the opening of the container.

11. The vacuum brewed beverage apparatus as described in claim 1, wherein the brew assembly also includes a particle filter disposed in the endcap enabled to filter leftover particles from the brewed product.

12. The vacuum brewed beverage apparatus as described in claim 11, wherein the brew assembly further includes a particle pre-filtering tool having a screen member for capturing the leftover particles not mixed with the liquid, and also having a handle connected to the screen member.

13. The vacuum brewed beverage apparatus as described in claim 12, wherein the screen member includes a circumference enabled to match a circumference of the brewing chamber to ensure capturing of the leftover particles in the brewing chamber.

14. The vacuum brewed beverage apparatus as described in claim 1, wherein the control assembly has a brew chamber support member with the brew chamber removably interfacing with the brew chamber support member, and has a vacuum connecting member interconnecting the vacuum pump to the vacuum tube and also has a vacuum release valve disposed inline of the vacuum connecting member.

15. The vacuum brewed beverage apparatus as described in claim 1, wherein the control assembly also has a container support member with the container removably interfacing with the container support member.

16. The vacuum brewed beverage apparatus as described in claim 1, wherein the control assembly also includes a first hose interconnecting the container to the liquid-transferring conduit and further includes a second hose interconnecting the brewing chamber to the liquid-transferring conduit.

17. The vacuum brewed beverage apparatus as described in claim 16, wherein the first hose is connected to the container support member and the second hose is connected to the brew chamber support member.

* * * * *